(12) United States Patent  (10) Patent No.: US 9,329,653 B2
Dain  (45) Date of Patent: May 3, 2016

(54) SERVER SYSTEMS HAVING SEGREGATED POWER CIRCUITS FOR HIGH AVAILABILITY APPLICATIONS

(71) Applicant: International Business Machines Corporation, Armonk, NY (US)

(72) Inventor: Joseph W. Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/312,512

(22) Filed: Jun. 23, 2014

(65) Prior Publication Data

US 2014/0304532 A1   Oct. 9, 2014

Related U.S. Application Data

(62) Division of application No. 13/069,263, filed on Mar. 22, 2011, now Pat. No. 8,793,514.

(51) Int. Cl.
*G06F 1/26* (2006.01)
*H02J 9/06* (2006.01)

(52) U.S. Cl.
CPC *G06F 1/26* (2013.01); *G06F 1/263* (2013.01); *H02J 9/06* (2013.01)

(58) Field of Classification Search
CPC .................................. G06F 1/26; G06F 1/263
See application file for complete search history.

(56) References Cited

U.S. PATENT DOCUMENTS

| | | | |
|---|---|---|---|
| 5,809,256 A * | 9/1998 | Najemy | 710/302 |
| 5,905,994 A | 5/1999 | Hori et al. | |
| 6,622,257 B1 | 9/2003 | Rollins et al. | |
| 6,950,952 B2 | 9/2005 | Felsman | |
| 7,350,090 B2 | 3/2008 | Baurer et al. | |
| 7,464,214 B2 | 12/2008 | Davies et al. | |
| 7,636,861 B2 | 12/2009 | Leech et al. | |
| 7,774,633 B1 | 8/2010 | Harrenstien et al. | |
| 7,805,618 B2 | 9/2010 | Covi et al. | |
| 8,793,514 B2 | 7/2014 | Dain | |
| 2006/0271810 A1 | 11/2006 | Hsu et al. | |

(Continued)

FOREIGN PATENT DOCUMENTS

| | | |
|---|---|---|
| CN | 101371231 | 2/2009 |
| EP | 1984823 | 10/2008 |

(Continued)

OTHER PUBLICATIONS

Restriction/Election Requirement from U.S. Appl. No. 13/069,263 dated May 30, 2013.

(Continued)

*Primary Examiner* — Kim Huynh
*Assistant Examiner* — Vincent Chang
(74) *Attorney, Agent, or Firm* — Zilka-Kotab, PC

(57) ABSTRACT

A method for replacing or repairing a non hot swappable component according to one embodiment includes supplying power to a first motherboard partition, a first storage partition, a second motherboard partition, and a second storage partition concurrently. The first storage partition is accessed and utilized with the second motherboard partition. The power to the first motherboard partition s selectively severed, and a non hot swappable component that has failed is removed from the first motherboard partition and replaced with a functioning component. Power is restored to the first motherboard partition.

19 Claims, 6 Drawing Sheets

(56) References Cited

U.S. PATENT DOCUMENTS

| | | |
|---|---|---|
| 2007/0220324 A1 | 9/2007 | Covi et al. |
| 2007/0226403 A1 | 9/2007 | Son et al. |
| 2008/0192431 A1 | 8/2008 | Bechtolsheim |
| 2008/0215871 A1 | 9/2008 | Chan |
| 2010/0095048 A1 | 4/2010 | Bechtolsheim et al. |
| 2010/0195289 A1 | 8/2010 | Hubal |
| 2012/0246491 A1 | 9/2012 | Dain |

FOREIGN PATENT DOCUMENTS

| | | |
|---|---|---|
| JP | 61/262871 | 11/1986 |
| JP | 2006-277508 | 10/2006 |
| WO | 2007/077585 | 7/2007 |
| WO | 2007-093488 | 8/2007 |

OTHER PUBLICATIONS

Non-Final Office Action from U.S. Appl. No. 13/069,263 dated Sep. 12, 2013.

Notice of Allowance and Fee(s) Due from U.S. Appl. No. 13/069,263 dated Mar. 20, 2014.

Dain, J.W., U.S. Appl. No. 13/069,263, filed Mar. 22, 2011.

* cited by examiner

SERVER SYSTEMS HAVING SEGREGATED POWER CIRCUITS FOR HIGH AVAILABILITY APPLICATIONS

RELATED APPLICATIONS

This application is a divisional of copending U.S. patent application Ser. No. 13/069,263, filed Mar. 22, 2011, which is herein incorporated by reference.

BACKGROUND

The present invention relates to disaster recovery storage solutions, and more particularly, to asynchronous mirroring for disaster recovery.

Conventional integrated servers and storage units contain redundant power supplies that provide power to the integrated drives as well as the motherboard. Typically, a switch on the outside of the hardware chassis toggles power on and off for the entire unit, e.g., motherboard and associated components and serial advanced technology attachment (SATA) drives. For particular applications, it is advantageous to create a high availability configuration with two or more integrated server and storage solutions where the application code running on each unit can see the storage of its local chassis as well as the remote chassis.

BRIEF SUMMARY

A method for replacing or repairing a non hot swappable component according to one embodiment includes supplying power to a first motherboard partition, a first storage partition, a second motherboard partition, and a second storage partition concurrently. The first storage partition is accessed and utilized with the second motherboard partition. The power to the first motherboard partition is selectively severed, and a non hot swappable component that has failed is removed from the first motherboard partition and replaced with a functioning component. Power is restored to the first motherboard partition.

In another embodiment, a method for replacing or repairing a non hot swappable component includes supplying power to a first motherboard partition, a first storage partition, a second motherboard partition, and a second storage partition concurrently. The first motherboard partition includes a first motherboard and a first processor capable of accessing a first memory in the first storage partition. The second motherboard partition includes a second motherboard and a second processor capable of accessing a second memory in the second storage partition. The first processor is capable of accessing the second memory, and the second processor is capable of accessing the first memory. The method also includes accessing and utilizing the second storage partition with the first motherboard partition. The power to the first storage partition is selectively severed. A non hot swappable component that has failed is removed from the first storage partition and replaced with a functioning component. Power is restored to the first storage partition.

In yet another embodiment, a method for replacing or repairing a non hot swappable component includes supplying power to a first motherboard partition, a first storage partition, a second motherboard partition, and a second storage partition concurrently. The second storage partition is accessed and utilized with the first motherboard partition. The power to the first storage partition is selectively severed. A non hot swappable component that has failed is removed from the first storage partition and replaced with a functioning component. Power is restored to the first storage partition.

Other aspects and embodiments of the present invention will become apparent from the following detailed description, which, when taken in conjunction with the drawings, illustrates by way of example the principles of the invention.

DETAILED DESCRIPTION

Figure 1:
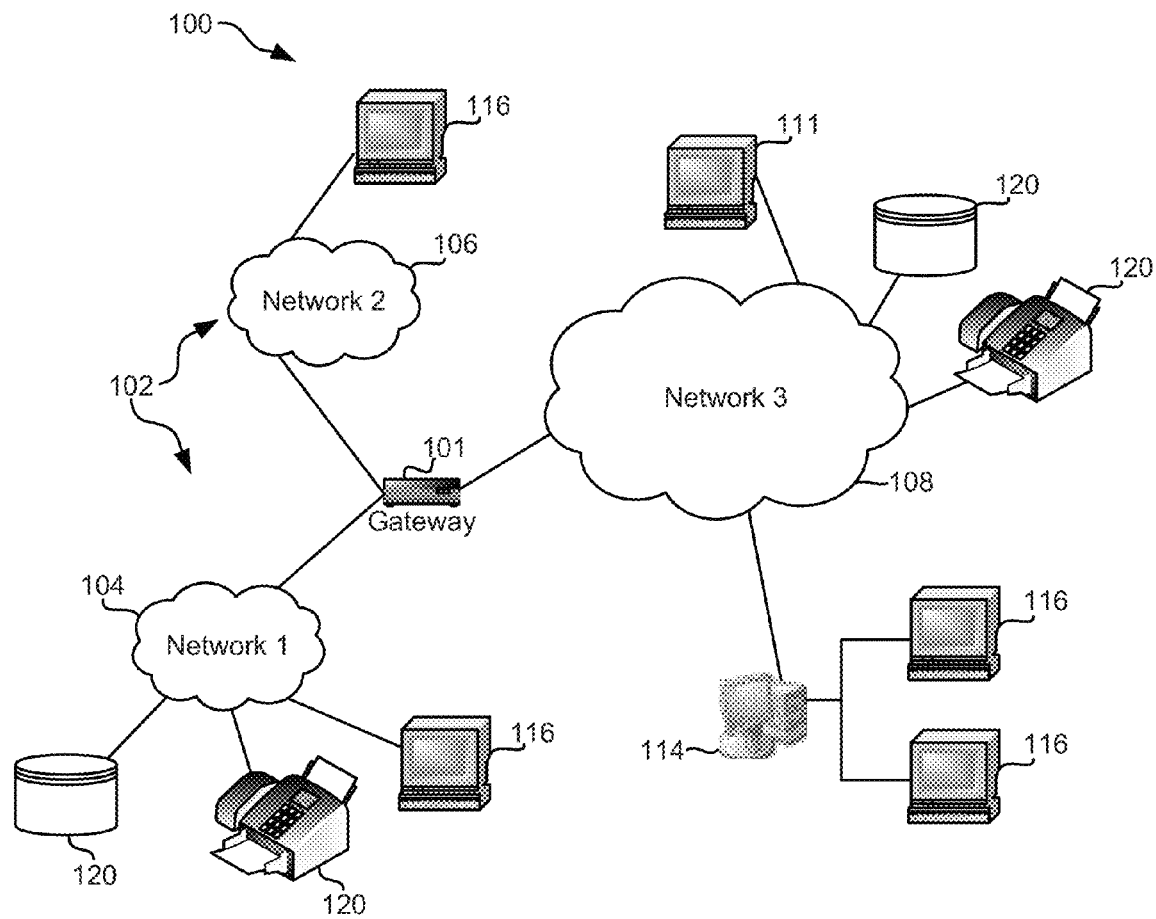
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, power to memory storage may be segregated from power to the motherboard in a server system, such as an integrated server and storage solution. In one embodiment, this may be accomplished using a power circuit and switches that allow power to be severed from a portion of the power circuit which feeds the motherboard and a portion of the power circuit which feeds the memory storage to provide the ability to repair each component separately while maintaining the operability of the other component. This allows for repairs to be made to components in the server system which are not hot swappable components while still keeping the integrated storage powered on to allow an operating system (OS) and/or any applications running in a coupled server system, such as another integrated server and storage solution, to be able to access the integrated storage on the unit that is undergoing a repair action.

According to one general embodiment, a server system includes a motherboard partition having a motherboard and at least one processor coupled to the motherboard, each processor also coupled to a memory, a storage partition having the memory, and a power circuit being capable of supplying current to the motherboard partition and the storage partition independently. The power circuit includes at least two redundant power supplies in parallel in the power circuit, each redundant power supply being capable of providing an amount of current necessary to operate the server system. Also, the motherboard partition is adapted to run a server operating system (OS).

In another general embodiment, an active cluster system includes first and second server systems. The first server system includes a first motherboard partition having a first motherboard and at least one first processor coupled to the first motherboard, each first processor being coupled to a first memory, a first storage partition including the first memory, and a first power circuit being capable of supplying current to the first motherboard partition and the first storage partition, the first power circuit including at least one first power supply being capable of providing at least an amount of current necessary to operate the first server system. The second server system includes a second motherboard partition including a second motherboard and at least one second processor coupled to the second motherboard, each second processor being coupled to a second memory, a second storage partition including the second memory, and a second power circuit being capable of supplying current to the second motherboard partition and the second storage partition, the second power circuit including at least one second power supply being capable of providing at least an amount of current necessary to operate the second server system. Also, the first motherboard partition and the second motherboard partition are adapted to run a server OS.

In another general embodiment, a method for replacing or repairing a non hot swappable component includes supplying power to a first motherboard partition, a first storage partition, a second motherboard partition, and a second storage partition concurrently, accessing and utilizing the first storage partition with the second motherboard partition, selectively severing the power to the first motherboard partition, removing a non hot swappable component that has failed from the first motherboard partition, replacing the non hot swappable component in the first motherboard partition with a functioning component, and restoring power to the first motherboard partition. The first motherboard partition comprises a first motherboard and a first processor capable of accessing a first memory in the first storage partition, the second motherboard partition comprises a second motherboard and a second processor capable of accessing a second memory in the second storage partition, the first processor is capable of accessing the second memory, and the second processor is capable of accessing the first memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
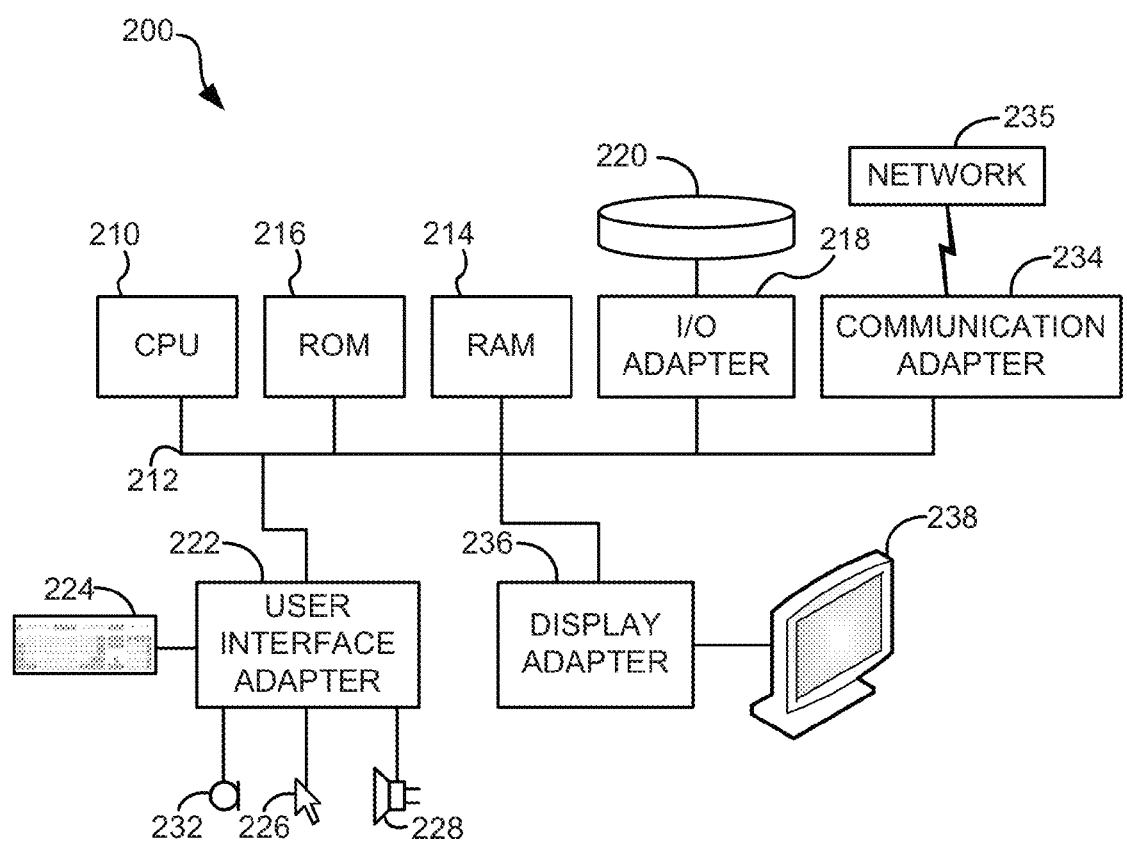
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system (OS) such as the MICROSOFT WINDOWS OS, IBM z/OS, a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, any logic described herein above may be implemented as a method on any device and/or system, or as a computer program product, according to various embodiments.

Figure 3B:
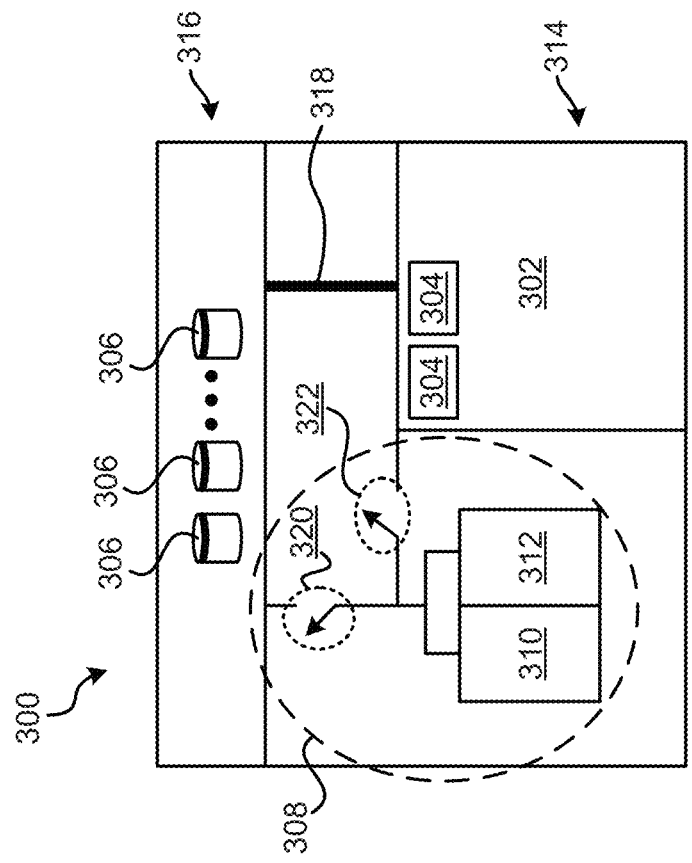
FIG. 3B shows a simplified schematic diagram of a server system, according to one embodiment.
Figure 3A:
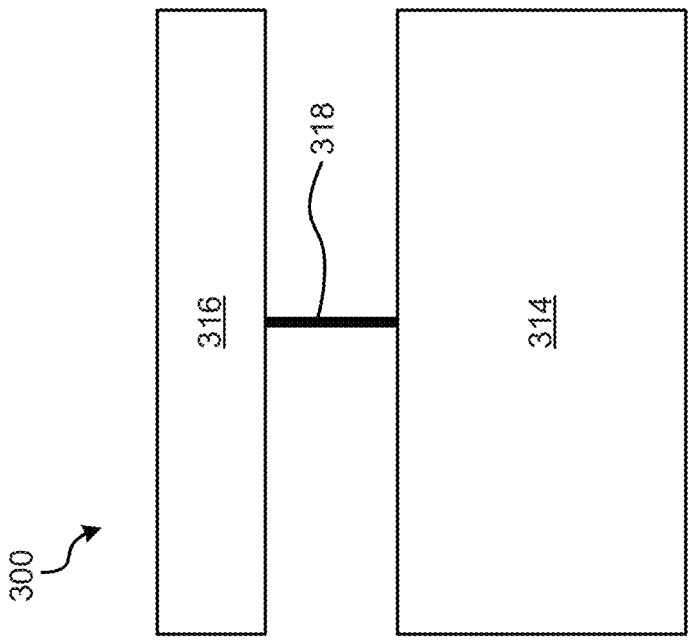
FIG. 3A shows a logical view of a server system, according to one embodiment.

Now referring to FIG. 3A, a logical view of a server system 300 is shown, according to one embodiment.

The server system 300 comprises a motherboard logical partition 314 coupled to a storage logical partition 316. The motherboard logical partition 314 is coupled to the storage logical partition 316 via one or more connections 318, which may be any connection as would be known in the art, including but not limited to small computer system interface (SCSI), serial attached small computer system interface (SAS), fibre channel (FC), fibre channel over Ethernet (FCoE), internet small computer system interface (iSCSI), etc. The motherboard logical partition 314 may comprise a motherboard, at least one processor capable of executing computer readable program code, for executing functions of a motherboard logical partition, etc. The storage logical partition 316 comprises memory of any type known in the art, such as hard disk drives (HDDs), Flash memory, solid state storage devices, RAM, combinations thereof, etc., for storing computer readable program code, logic, software modules, data, etc. The server system 300 also includes a power circuit that is capable of supplying current to the motherboard partition 314 and the storage partition 316 independently.

Now referring to FIG. 3B, a general schematic view of the server system 300 is shown, according to one embodiment. The server system 300 comprises a motherboard partition 314 which comprises a motherboard 302 coupled to one or more processors 304, each processor 304 being capable of executing computer readable program code. The at least one processor 304 is further coupled to a memory 306 for storing computer readable program code, logic, software modules, etc., via one or more connections 318. In addition, the motherboard partition 314 is adapted to run a server OS. The server system 300 also includes a power circuit 308 that is capable of supplying current to the motherboard partition 314 (including the motherboard 302 and the at least one processor 304) and the memory partition 316 (including the memory 306) independently. The power circuit 308 comprises at least two redundant power supplies 310, 312 positioned in parallel in the power circuit 308, each redundant power supply 310, 312 being capable of providing an amount of current necessary to operate the server system 300.

In one embodiment, the integrated server and storage solution, such as the server system 300, may include a motherboard 302, which may be part of the motherboard logical partition 314 that may run the server OS and, in one embodiment, a server application, such as IBM ProtecTIER code. The server system 300 may operate any OS, such as IBM z/OS, MICROSOFT WINDOWS OS, UNIX OS, MAC OS, etc.

With continuing reference to FIG. 3B, the server system 300 may also include any of the following cold swap physical components: sysplanar, DIMMs, CPUs, PCI adapters, internal boot drives, etc.

According to one embodiment, a SAS RAID card may be connected through one of the PCI adapter slots on the motherboard 302 and a mini-SAS cable may be connected to a SAS expander in the storage partition 316.

According to some embodiments, the memory 306 may comprise one or more HDDs, flash memory, solid state devices, RAM, or any other memory as would be known by one of skill in the art. In a further embodiment, the HDDs may be arranged in a redundant array of independent disks (RAID).

In another embodiment, the server system 300 may comprise a first switch 320 positioned between the at least two redundant power supplies 310, 312 and the memory partition 316. The first switch 320 is independently operable to sever the power circuit 308 to the memory partition 316.

In yet another embodiment, the server system 300 may comprise a second switch 322 positioned between the at least two redundant power supplies 310, 312 and the motherboard partition 314. The second switch 322 is operable to sever the power circuit 308 to the motherboard partition 314.

According to various embodiments, the at least one processor 304 may include one or more CPUs, graphics processors, communications processors, etc.

In one approach, the server system 300 may have a height consistent with a 1U rack element and may be adapted to fit in a 1U rack space, as would be understood by one of skill in the art.

In some embodiments, the at least one processor 304 may also execute a server application/code, such as IBM ProtecTIER, among others. In this example, when the application code is ProtecTIER, the server system 300 may be run in a clustered/high available configuration comprising two server systems 300, one designated as ProtecTIER Node A and the second being designated as ProtecTIER Node B. ProtecTIER in node A may be capable of identifying and using the memory 306 of its own system and that of ProtecTIER node B. The memory 306 in Node A and Node B may collectively appear as a single deduplication repository, in some embodiments.

In the event that a component that is not hot swappable (for example a PCI adapter, a fibre channel HBA, etc.) fails, the power may be removed/severed from the portion of the power circuit that powers this failed component in order to replace/repair the failed component, without removing power to the rest of the power circuit. This is an advantage over prior art systems where the power had to be removed from the entire server system 300, which takes the entire chassis (including the integrated memory storage 306) offline, which in certain applications, such as ProtecTIER, may cause the overall product to go offline, thus making the overall server system incapable of providing high availability.

According to another embodiment, a server system 300 may use a storage bridge bay (SBB) architecture for integrated server and storage solutions. In the SBB architecture, small, modular processing modules that include memory, processor, fibre channel, Ethernet connectivity, etc., may be installed in an integrated server and storage solution (server system). For example, two SBB modules may be installed in a 2U, 12 drive integrated server and storage solution to provide high availability.

In the event that a component within one of the SBBs fails, the entire SBB unit may be removed and the remaining SBB unit in the integrated server and storage chassis remains online. In this case, each SBB module may be 1U in height and does not have enough space to contain adequate processors, memory, and adapter cards for heavy duty applications, such as ProtecTIER.

Figure 4A:
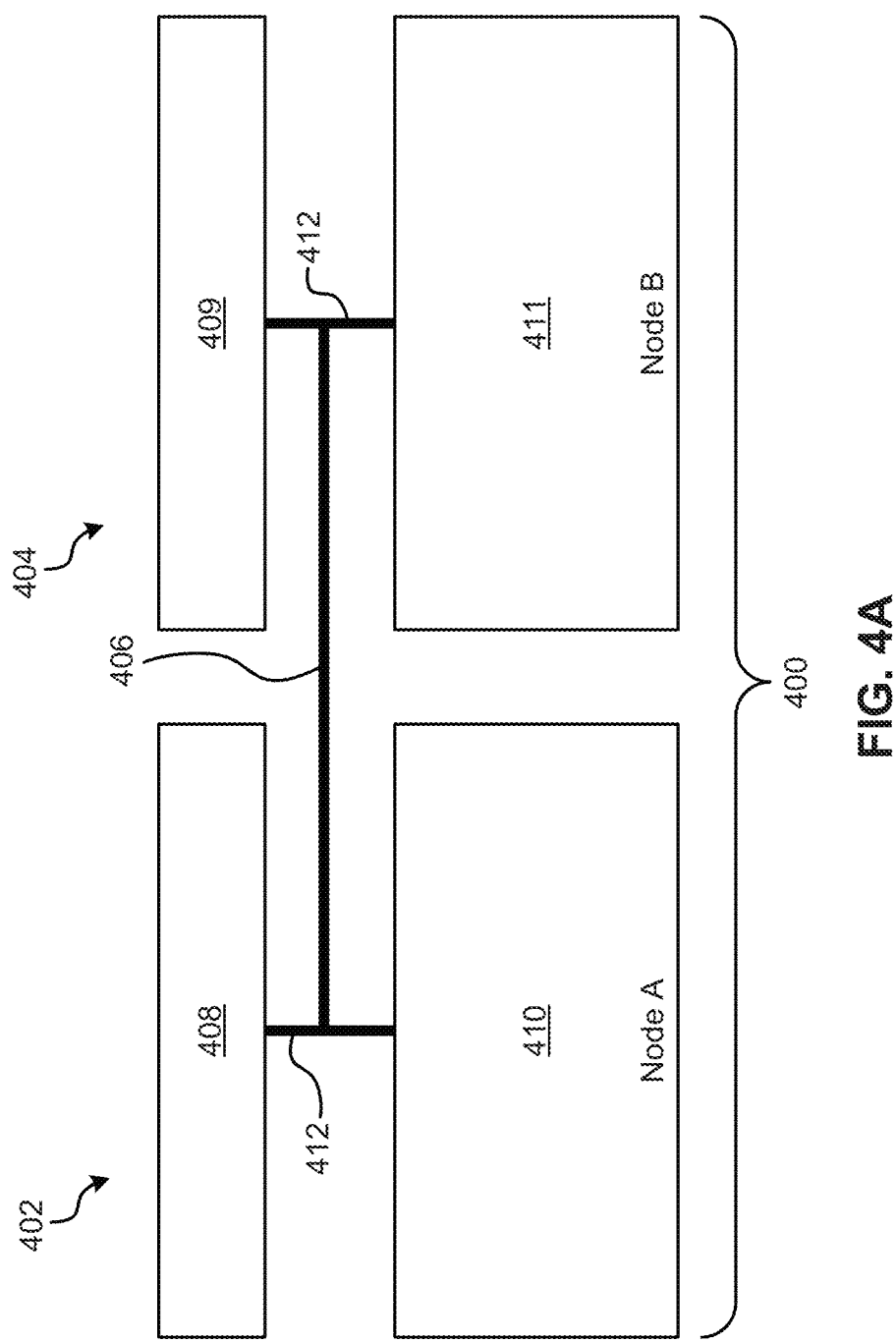
FIG. 4A shows a logical view of a multiple node active cluster system, according to one embodiment.

Referring now to FIG. 4A, a logical view of a multiple node active cluster system 400 is shown according to one embodiment. In this case, there are two nodes, but any number of nodes may be used as would be understood by one of skill in the art, depending on available space, computing power, power availability, etc., among other factors. The active cluster system 400 comprises two or more server systems 402, 404 in a clustered configuration. The first server system 402 may be designated as Node A, and the second server system 404 may be designated Node B. Additional server systems may follow this naming convention, e.g., Node C, Node D, etc. Each of the clustered server systems have one or more external connections 406 to the other server systems. Particularly, the first motherboard partition 410 of the first server system 402 has a connection 406 to the second storage partition 409 of the second server system 404. Similarly, the second motherboard partition 411 of the second server system 404 has an external connection to the first storage partition 408 of the first server system 402. Each server system 402, 404 also has one or more internal connections 412 between their respective motherboard partitions and storage partitions.

Figure 4B:
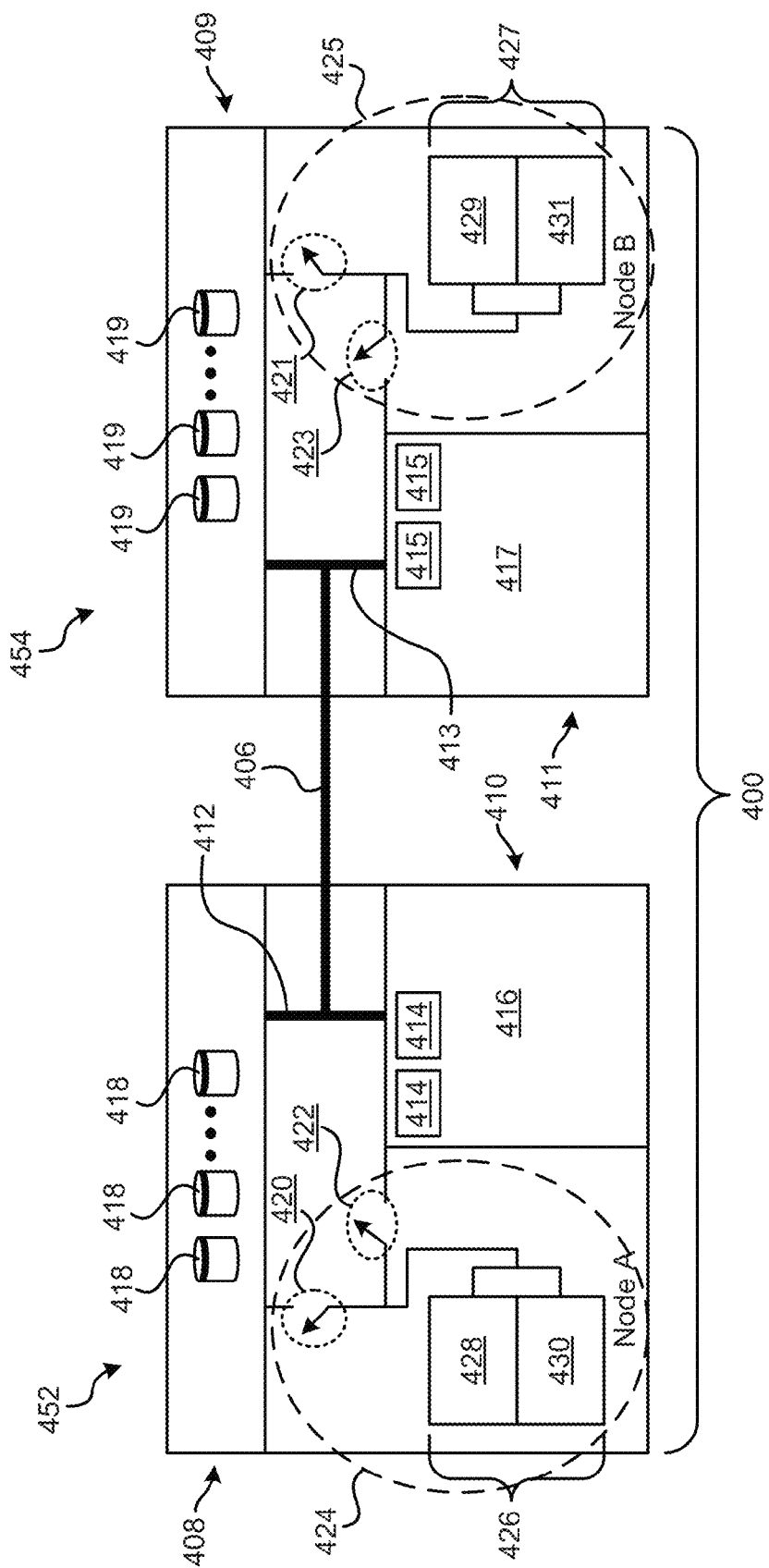
FIG. 4B shows a simplified schematic diagram of a multiple node active cluster system, according to one embodiment.

Now referring to FIG. 4B, a schematic view of a multiple node active cluster system 400 is shown, according to one embodiment. The active cluster system 400 includes at least a first server system 452 and a second server system 454.

The first server system 452 comprises a first motherboard partition 410 comprising a first motherboard 416 and at least one first processor 414 coupled to the first motherboard 416, with each first processor 414 being capable of executing computer readable program code. Each first processor 414 is coupled to a first memory 418 for storing computer readable program code, logic, software modules, etc. The first memory 418 is in a first memory partition 408. In addition, the first motherboard partition 410 is adapted to run a server OS. The first server system 452 also includes a first power circuit 424 that is capable of supplying current to the first motherboard partition 410 (including the first motherboard 416 and the at least one first processor 414) and the first memory partition 408 (including the first memory 418) independently. The first power circuit 424 comprises at least one first power supply 426, the at least one first power supply 426 being capable of providing at least an amount of current necessary to operate the first server system 452.

The second server system 454 comprises a second motherboard partition 411 comprising a second motherboard 417 and at least one second processor 415 coupled to the second motherboard 417, each second processor 415 being capable of executing computer readable program code. Each second processor 415 is coupled to a second memory 419 for storing computer readable program code, logic, software modules, etc. The second memory 419 is in a second memory partition 409. The second server system 452 also includes a second power circuit 425 that is capable of supplying current to the second motherboard partition 411 (including the second motherboard 417 and the at least one second processor 415) and the second memory partition 409 (including the second memory 419) independently. The second power circuit 425 comprises at least one second power supply 427, the at least one second power supply 427 being capable of providing at least an amount of current necessary to operate the second server system 454. The first motherboard partition 410 and the second motherboard partition 411 are adapted to run a server OS.

According to some embodiments, the first and/or second memory 418, 419 may include one or more HDDs, Flash memory, RAM, or any other memory as would be known by one of skill in the art. In a further embodiment, the HDDs may be arranged in a RAID.

In another embodiment, the first and/or second server systems 452, 454 may comprise a first switch 420, 421 positioned between the at least one first power supply 426 or second power supply 427 and the first memory partition 408 or second memory partition 409, respectively. The first switch 420, 421 is independently operable to sever the first and/or second power circuit 424, 425 to the first memory partition 408 or second memory partition 409, respectively.

In yet another embodiment, the first and/or second server systems 452, 454 may comprise a second switch 422, 423 positioned between the at least one first power supply 426 or second power supply 427 and the first motherboard partition 410 or second motherboard partition 411, respectively. The second switch 422, 423 is operable to sever the first and/or second power circuit 424, 425 to the first motherboard partition 410 or second motherboard partition 411, respectively.

In another approach, the at least one first power supply 426 and the at least one second power supply 427 may each be capable of providing at least an amount of current necessary to operate the first server system 452 and the second server system 454 concurrently.

According to one embodiment, the at least one first power supply 426 and/or the at least one second power supply 427 may each comprise two redundant power supplies (428 and 430 for the first power supply 426; 429 and 431 for the second power supply 427), each redundant power supply being capable of providing at least an amount of current necessary to operate the first server system 452 or second server system 454, respectively. The respective redundant power supplies 428 and 430; 429 and 431, may be positioned in parallel in each respective power circuit.

In one approach, the active cluster system 400 may have a height consistent with a 2U rack element and may be adapted to fit in a 2U rack space, as would be understood by one of skill in the art.

With continuing reference to FIG. 4B and in another approach, the at least one first processor 414 may be capable of utilizing the second memory 419 through the server OS even when the second motherboard partition 411 is severed from the second power circuit 425.

In yet another approach, the at least one second processor 415 may be capable of utilizing the first memory 418 through the server OS even when the first motherboard partition 410 is severed from the first power circuit 424.

In one embodiment, in order to provide high availability in the event of a non hot swappable component failure on the first motherboard 416 in Node A, separate power circuits (first and second power circuits 424, 425) may be used to segregate the power from the motherboards and the memories. These separate power circuits 424, 425 may include one or more switches to remove power from the motherboards and/or the memories.

Switches 420, 421, 422, 423 may be controlled via one or more external buttons on the chassis or may be controlled via a baseboard management controller (BMC), via IPMI (remotely), etc. In the case of a BMC controlling the switches, a separate power circuit may be run from the power supplies to the BMC.

In one example, in the event that a non hot swappable memory DIMM fails on Node A's first motherboard 416, a switch 422 may be toggled to the off position (open position, as shown), removing power from the first motherboard 416 such that the component on the motherboard may be repaired on the first server system 452. In this example, the first memory 418 is still receiving power. Upon completing the repair action, the switch 422 may be moved to the on position (closed position), and power may be resumed to the first motherboard 416.

Figure 5:
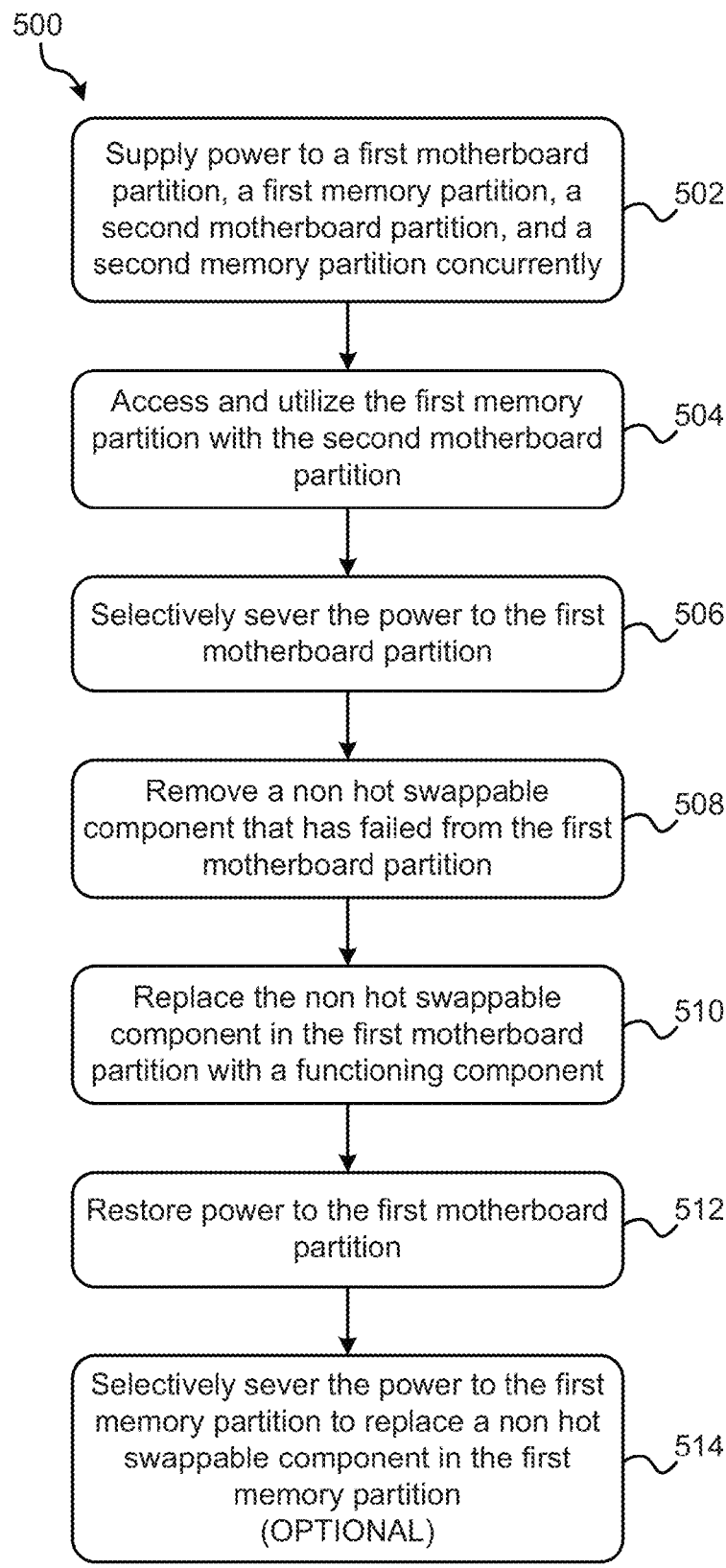
FIG. 5 shows a flowchart of a method for replacing or repairing a non hot swappable component, according to one embodiment.

Now referring to FIG. 5, a method 500 for replacing or repairing a non hot swappable component is shown according to one embodiment. The method 500 may be carried out in any desired environment, including those described in FIGS. 1-4, in various embodiments. Of course, more or less operations than those described below may be included in the method 500, in some approaches, as would be understood by one of skill in the art.

In operation 502, power is supplied to a first motherboard partition, a first storage partition, a second motherboard partition, and a second storage partition concurrently. The first motherboard partition comprises a first motherboard and a first processor capable of accessing a first memory in the first storage partition, and the second motherboard partition comprises a second motherboard and a second processor capable of accessing a second memory in the second storage partition. In addition, the first processor is capable of accessing the second memory, and the second processor is capable of accessing the first memory.

In various embodiments, the motherboard partition may include any number of components, both hot swappable and non hot swappable, as would be understood by one of skill in the art, such as processors, I/O, adapters, graphics cards, interfaces, etc.

In more embodiments, the storage partition may include any number of components, as would be understood by one of skill in the art. The connections between the motherboard partitions and the storage partitions are maintained even when power is severed to the motherboard partitions and the storage partitions.

In operation 504, the first storage partition is accessed and utilized with the second motherboard partition. This allows the second processor to use the second memory, thereby allowing the first motherboard to be shutdown so that component may be swapped, such as I/O components, processors, adapters, etc.

In operation 506, the power to the first motherboard partition is selectively severed. In one embodiment, this may be accomplished by operating a switch to selectively sever the power to the first motherboard partition, such as a power switch positioned in a power circuit between a power supply and the first motherboard partition.

In operation 508, a non hot swappable component that has failed is removed from the first motherboard partition. Of course, other components may be repaired, replaced, and/or inspected during this operation.

In operation 510, the non hot swappable component is replaced in the first motherboard partition with a functioning component. The functioning component may be a new component, a reconditioned component, or the failed component that has been repaired, according to various embodiments.

In operation 512, power is restored to the first motherboard partition.

In optional operation 514, the power to the first storage partition is selectively severed to replace a non hot swappable component in the first storage partition. After the replacement, power may be restored to the first storage partition. During the time when the power is severed, the first motherboard partition may access and utilize the second memory in the second storage partition with which to perform tasks and operations.

Of course, many various other scenarios may be envisioned where power segregation may aid in diagnostics, repairs, troubleshooting, equipment failures, etc., as would be understood by one of skill in the art, and the embodiments described herein are not limited to the specific examples given.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for replacing or repairing a non hot swappable component, the method comprising:
   supplying power to a first motherboard partition, a first storage partition, a second motherboard partition, and a second storage partition concurrently,
   wherein the first motherboard partition comprises a first motherboard and a first processor capable of accessing a first memory in the first storage partition,
   wherein the second motherboard partition comprises a second motherboard and a second processor capable of accessing a second memory in the second storage partition,
   wherein the first motherboard partition and the first storage partition are part of a first system,
   wherein the second motherboard partition and the second storage partition are part of a second system, the second system being external to the first system and connected to the first system via an external connection extending between the first system and the second system:
   wherein the first processor is capable of accessing the second memory, and
   wherein the second processor is capable of accessing the first memory;
   accessing and utilizing the first storage partition with the second motherboard partition;
   selectively severing the power to the first motherboard partition;
   removing a non hot swappable component that has failed from the first motherboard partition:
   replacing the non hot swappable component in the first motherboard partition with a functioning component; and
   restoring power to the first motherboard partition.

2. The method as recited in claim 1, comprising selectively severing the power to the first storage partition to replace a non hot swappable component in the first storage partition; and
   wherein the selectively severing the power to the first motherboard partition comprises operating a switch to selectively sever the power to the first motherboard partition.

3. The method as recited in claim 2, wherein operating the switch is performed remotely using an Intelligent Platform Management Interface (IPMI).

4. The method as recited in claim 1, wherein the first motherboard partition comprises at least one hot swappable component and at least one non hot swappable component, the method comprising maintaining a connection between the first motherboard partition and the first storage partition while power is selectively severed from the first motherboard partition.

5. The method as recited in claim 1, the first system having an interface configured to connect the first motherboard partition to the second system via an external connection extending between the first system and the second system, the second system being powered separately from the first system.

6. The method as recited in claim 1, wherein the power is supplied by a power circuit capable of supplying current to the first motherboard partition and the first storage partition independently, the power circuit comprising: at least two redundant power supplies in parallel in the power circuit, each redundant power supply being capable of providing an amount of current necessary to operate the first motherboard partition and the first storage partition.

7. The method as recited in claim 6, wherein a first power switch is positioned between the at least two redundant power supplies and the first storage partition, wherein the first power switch is independently operable to sever the power circuit to the first storage partition; and
   wherein a second power switch positioned between the at least two redundant power supplies and the first motherboard partition, wherein the second power switch is operable to sever the power circuit to the first motherboard partition.

8. The method as recited in claim 1, comprising selectively severing the power to the first storage partition to replace a non hot swappable component in the first storage partition;
   wherein each of the first motherboard partition and the second motherboard partition are configured to run a server operating system (OS);
   wherein the first memory comprises one or more hard disk drives:
   wherein the first system has an interface configured to connect the first motherboard partition to the second system via an external connection extending between the first system and the second system, the second system being powered separately from the first system;
   wherein the selectively severing the power to the first motherboard partition comprises operating a switch to selectively sever the power to the first motherboard partition;
   wherein the power is supplied by a power circuit capable of supplying current to the first motherboard partition and the first storage partition independently, the power circuit comprising: at least two redundant power supplies in parallel in the power circuit, each redundant power supply being capable of providing an amount of current necessary to operate the first motherboard partition and the first storage partition;
   wherein a first power switch is positioned between the at least two redundant power supplies and the first storage partition, wherein the first power switch is independently operable to sever the power circuit to the first storage partition; and wherein a second power switch positioned between the at least two redundant power supplies and the first motherboard partition, wherein the second power switch is operable to sever the power circuit to the first motherboard partition.

9. A method for replacing or repairing a non hot swappable component, the method comprising:

supplying power to a first motherboard partition, a first storage partition, a second motherboard partition, and a second storage partition concurrently, wherein the first motherboard partition comprises a first motherboard and a first processor capable of accessing a first memory in the first storage partition, wherein the second motherboard partition comprises a second motherboard and a second processor capable of accessing a second memory in the second storage partition, wherein the first processor is capable of accessing the second memory, and wherein the second processor is capable of accessing the first memory;

accessing and utilizing the first storage partition with the second motherboard partition;

accessing and utilizing the second storage partition with the first motherboard partition;

selectively severing the power to the first storage partition using a first power switch positioned between at least one first power supply and the first storage partition;

removing a non hot swappable component that has failed from the first storage partition;

replacing the non hot swappable component in the first storage partition with a functioning component; and restoring power to the first storage partition using the first power switch.

10. The method as recited in claim 9, comprising:

connecting the first motherboard partition to the second storage partition via an external connection extending between a first server system and a second server system, the first server system housing the first motherboard partition and the first storage partition and the second server housing the second motherboard partition and the second storage partition: and selectively severing the power to the first motherboard partition using a second power switch positioned between the at least one first power supply and the first motherboard partition.

11. A method for replacing or repairing a non hot swappable component, the method comprising:

supplying power to a first motherboard partition, a first storage partition, a second motherboard partition, and a second storage partition concurrently, wherein the first motherboard partition and the first storage partition are part of a first system, wherein the second motherboard partition and the second storage partition are part of a second system, the second system being external to the first system and connected to the first system via an external connection extending between the first system and the second system;

accessing and utilizing the first storage partition with the second motherboard partition;

accessing and utilizing the second storage partition with the first motherboard partition;

selectively severing the power to the first storage partition using a first power switch;

removing a non hot swappable component that has failed from the first storage partition;

replacing the non hot swappable component in the first storage partition with a functioning component; and restoring power to the first storage partition.

12. The method as recited in claim 11, wherein the selectively severing the power to the first storage partition comprises operating a switch via a baseboard management controller (BMC) to selectively sever the power to the first storage partition.

13. The method as recited in claim 11, comprising selectively severing the power to the first motherboard partition to replace a non hot swappable component in the first motherboard partition.

14. The method as recited in claim 11, wherein each of the first motherboard partition and the second motherboard partition are configured to run a server operating system (OS).

15. The method as recited in claim 11, wherein the first motherboard partition is part of a first system having an interface configured to connect the first motherboard partition to a second system having the second storage partition via an external connection extending between the first system and the second system, the second system being external to the first system and powered separately therefrom.

16. The method as recited in claim 11, wherein the power is supplied by a power circuit capable of supplying current to the first motherboard partition and the first storage partition independently, the power circuit comprising: at least two redundant power supplies in parallel in the power circuit, each redundant power supply being capable of providing an amount of current necessary to operate the first motherboard partition and the first storage partition.

17. The method as recited in claim 16, wherein a first power switch is positioned between the at least two redundant power supplies and the first storage partition, wherein the first power switch is independently operable to sever the power circuit to the first storage partition; and wherein a second power switch positioned between the at least two redundant power supplies and the first motherboard partition, wherein the second power switch is operable to sever the power circuit to the first motherboard partition.

18. The method as recited in claim 16, wherein the first motherboard partition comprises at least one hot swappable component and at least one non hot swappable component, the method comprising maintaining a connection between the first motherboard partition and the first storage partition while power is selectively severed from the first motherboard partition.

19. The method as recited in claim 18, comprising selectively severing the power to the first motherboard partition to replace a non hot swappable component in the first motherboard partition;

wherein the selectively severing the power to the first storage partition comprises operating a switch to selectively sever the to the first storage partition;

wherein each of the first and the second motherboard partitions are configured to run a server operating system (OS):

wherein the first motherboard partition is part of a first system having an interface configured to connect the first motherboard partition to a second system having the second storage partition via an external connection extending between the first system and the second system, the second system being external to the first system and powered separately therefrom;

wherein the power is supplied by a power circuit capable of supplying current to the first motherboard partition and the first storage partition independently, the power circuit comprising; at least two redundant power supplies in parallel in the power circuit, each redundant power supply being capable of providing an amount of current necessary to operate the first motherboard partition and the first storage partition; and wherein a first power switch is positioned between the at least two redundant power supplies and the first storage partition, wherein the first power switch is independently operable to sever the power circuit to the first storage partition.

* * * * *